US012801302B2

(12) United States Patent
Iyswaria et al.

(10) Patent No.: US 12,801,302 B2
(45) Date of Patent: Nov. 17, 2026

(54) SYSTEM AND METHOD FOR CUSTOMIZABLE LARGE DATA LOADING

(71) Applicant: Wells Fargo Bank, N.A., San Francisco, CA (US)

(72) Inventors: Shanu V. Iyswaria, Chennai (IN); Srinivasan Kalyanasundaram, Charlotte, NC (US); Angavai Krishnamoorthi, Sunnyvale, CA (US); Prashant Kumar, Bengaluru (IN); Angela E. Miller, York, SC (US); Venkata Rama Rao Yedlapalli, Woodbury, MN (US)

(73) Assignee: Wells Fargo Bank, N.A., San Francisco, CA (US)

(*) Notice: Subject to any disclaimer, the term of this patent is extended or adjusted under 35 U.S.C. 154(b) by 267 days.

(21) Appl. No.: 18/545,579

(22) Filed: Dec. 19, 2023

(65) Prior Publication Data

US 2025/0199776 A1 Jun. 19, 2025

(51) Int. Cl.
*G06F 8/36* (2018.01)
*G06F 3/06* (2006.01)
(Continued)

(52) U.S. Cl.
CPC .............. *G06F 3/0647* (2013.01); *G06F 8/34* (2013.01); *G06F 16/119* (2019.01); *G06F 9/546* (2013.01);
(Continued)

(58) Field of Classification Search
CPC ...... G06F 16/258; G06F 9/546; G06F 16/119; G06F 16/24573; G06F 3/0647; G06V 30/19147; H04Q 3/0066; G08G 1/096838
See application file for complete search history.

(56) References Cited

U.S. PATENT DOCUMENTS 8,745,233 B2 6/2014 Bartfai-walcott et al.
9,253,166 B2 2/2016 Gauda
(Continued)

FOREIGN PATENT DOCUMENTS

CN 114610442 6/2022
CN 113918284 8/2022
CN 111459415 5/2023

OTHER PUBLICATIONS

JP 6504190, (translation), Apr. 24, 2019, 22 pgs <JP_6504190.pdf>.*

(Continued)

*Primary Examiner* — Tuan A Vu
(74) *Attorney, Agent, or Firm* — SCHWEGMAN LUNDBERG & WOESSNER, P.A.

(57) ABSTRACT

Aspects of the present disclosure include systems and methods for receiving as input a large data file, and partitioning the large data file into a plurality of smaller partitioned data files. The methods further include generating, for each partitioned data file, a data schema based on an automated analysis of each partitioned data file, and generating a control file for each partitioned data file containing a record count. The methods also include loading, via a cloud loading system, each partitioned data file into a data store external to the cloud loading system based on the data schema, and validating that the data store has received all records in each of the partitioned data files based on the control file, wherein the cloud loading system is provided as a user-configurable cloud loading component used for developing a computer program.

20 Claims, 7 Drawing Sheets

(51) Int. Cl.

| | |
|---|---|
| ***G06F 8/34*** | (2018.01) |
| ***G06F 16/11*** | (2019.01) |
| *G06F 9/54* | (2006.01) |
| *G06F 16/2457* | (2019.01) |
| *G06F 16/25* | (2019.01) |
| *G06V 30/19* | (2022.01) |
| *G08G 1/0968* | (2006.01) |
| *H04Q 3/00* | (2006.01) |

(52) U.S. Cl.

CPC ...... *G06F 16/24573* (2019.01); *G06F 16/258* (2019.01); *G06V 30/19147* (2022.01); *G08G 1/096838* (2013.01); *H04Q 3/0066* (2013.01)

(56) References Cited

U.S. PATENT DOCUMENTS

| | | | |
|---|---|---|---|
| 9,602,598 | B2 | 3/2017 | Bhattacharya et al. |
| 9,967,318 | B2 | 5/2018 | Fu et al. |
| 10,789,089 | B2 | 9/2020 | Hari |
| 11,537,627 | B1 | 12/2022 | Baskaran et al. |
| 11,537,724 | B2 | 12/2022 | Kaul et al. |
| 12,321,323 | B1 * | 6/2025 | Underwood, Jr. .... G06F 16/119 |
| 2006/0209691 | A1 * | 9/2006 | Boggs .................. H04Q 3/0066 370/230 |
| 2008/0212845 | A1 * | 9/2008 | Lund ................ G06V 30/19147 715/224 |
| 2018/0210935 | A1 * | 7/2018 | Yazicioglu ............ G06F 16/258 |
| 2019/0205182 | A1 | 7/2019 | Sivasubramanian et al. |
| 2021/0149684 | A1 * | 5/2021 | Blagay ............. G08G 1/096838 |
| 2021/0373860 | A1 * | 12/2021 | Khan ...................... G06F 9/546 |
| 2024/0427755 | A1 * | 12/2024 | Aya ................... G06F 16/24573 |

OTHER PUBLICATIONS

Ma Ruirui et al., CN 113377815A, (translation), Sep. 10, 2021, 5 pgs <CN_113377815A.pdf>.*

Zhang et al., CN 106682082 (translation), Mar. 26, 2021, 12 pgs <CN_106682082.pdf>.*

Lv, Zhi-hui et al., CN 110717825, (translation), Apr. 7, 2023,12 pgs <CN_110717825.pdf>.*

Yang et al, CN 113489672, (translation) May 17, 2022, 12 pgs <CN_113489672.pdf>.*

KR 101907422 (translation), Oct. 12, 2018, 9 pgs <KR_101907422.pdf>.*

"Reuse and Migration of Legacy Systems to Interoperable Cloud Services", REMICS Consortium, (Jun. 7, 2011), 31 pgs.

"What is Cloud Migration? Strategy, Processes, Benefits and Risks", [Online]. Retrieved from the Internet: URL: https: cloudacademy.com blog cloud-migration-benefits-risks , (accessed on Jun. 21, 2023), 9 pgs.

Adam, John, "Understanding Cloud Agnostic Strategies—Why, Where, When and How?", [Online]. Retrieved from the Internet: URL:https: kruschecompany.com cloud-agnostic-strategies , (accessed on Jun. 21, 2023), 8 pgs.

Kumar, Arvind M, "An Generic Cloud Framework for Cloud Based Applications", International Journal of Advanced Networking and Applications (IJANA)1st International Conference on Innovations in Computing and Networking (ICICN16), CSE, RRCE, (2016), 5 pgs.

Perry, Yifat, "Cloud Migration Tools: Transferring Your Data with Ease", [Online]. Retrieved from the Internet: URL: https: bluexp.netapp.com blog cloud-migration-tools-transferring-your-data-with-ease, (accessed Jun. 21, 2023), 6 pgs.

Yang, Changsong, "Publicly verifiable outsourced data migration scheme supporting efficient integrity checking", Journal of Network and Computer Applications vol. 192, (Oct. 15, 2021), 9 pgs.

* cited by examiner

SYSTEM AND METHOD FOR CUSTOMIZABLE LARGE DATA LOADING

TECHNICAL FIELD

The present disclosure generally relates to automated loading of data, and more specifically to customizable large data loading.

BACKGROUND

Clients engage in a variety of transactions, for example, by using financial institutions such as banks. For example, transactions can include requesting loans, such as commercial real estate loans, residential real estate loans, personal loans and the like. The banks process various large data files as inputs to be loaded into other data stores, for example, for validation, regulatory reporting, and so on.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The techniques described herein solve various technical problems such as automatically analyzing large amounts of data (e.g., financial data having millions of records) to derive a storage format from the data itself. For example, a user-customizable component is provided for that is added into an integrated development environment (IDE), such as a computer program development IDE. The user-customizable component takes as input a large data file that is to be loaded into a cloud-based data store such as a relational database. The user-customizable component first partitions the data file into multiple smaller files using a round robin approach to more evenly distribute the records across the partitions.

The user-customizable component then converts the data into a desired format (e.g., JavaScript Object Notation (JSON)-based format) by automatically generating schemas based on the layout and data types in the input file. As the data is converted, the component generates control files for each partition containing record counts, as well as an overall summary file with total record counts.

The converted data (e.g., JSON-formatted data) is then validated to ensure it can be more properly read using the automatically generated schema. The user-customizable component also performs reconciliation by comparing record counts between the input data and output data to ensure no data was lost or corrupted during processing. Error checking is performed throughout the process. If any partition fails to load properly, the component can automatically restart and reprocess that partition. Accordingly, the user-customizable component efficiently partitions, converts, validates and loads large data files into the cloud data store while performing robust error checking and reconciliation.

Figure 1:
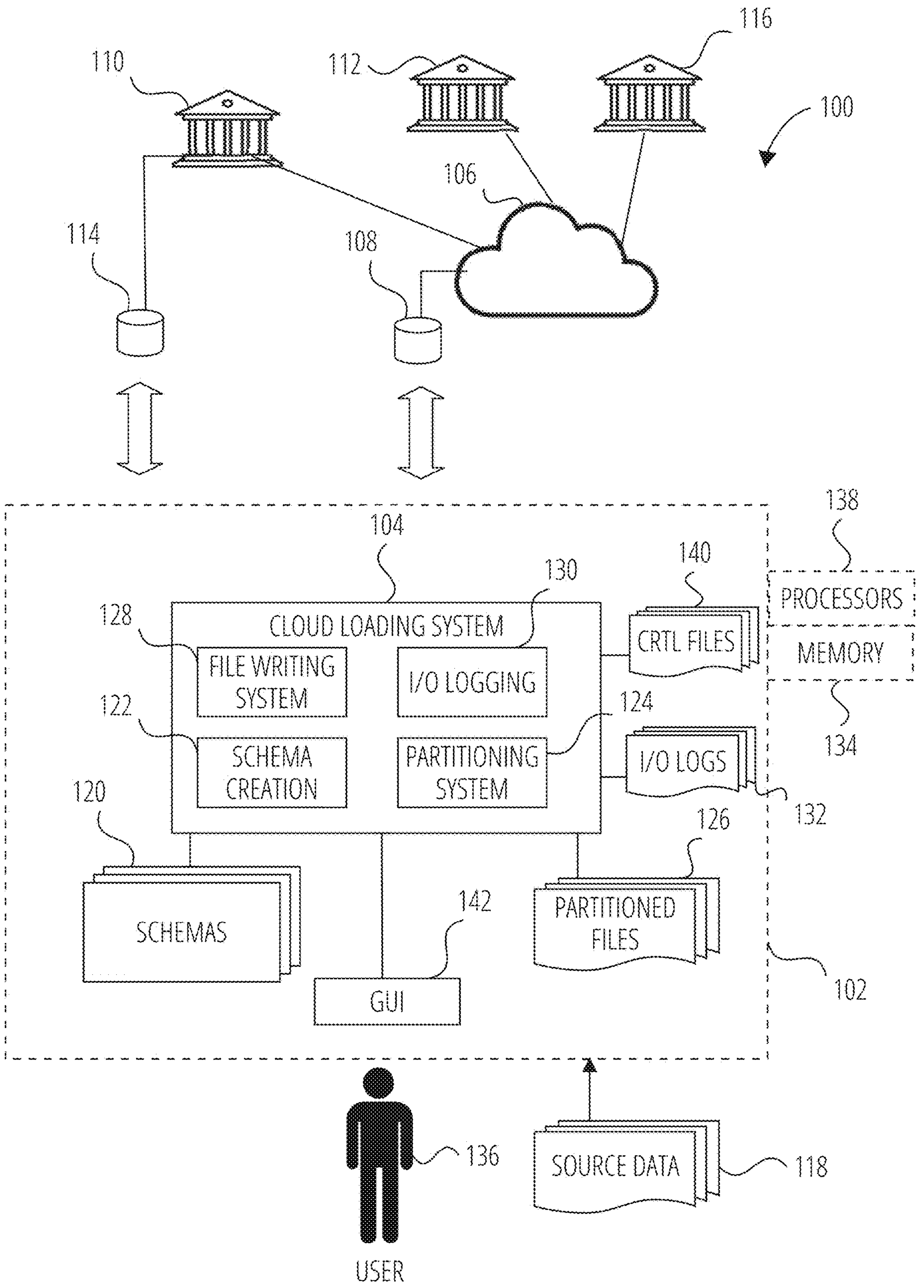
FIG. 1 is a block diagram illustrating a distributed computing system hosting a cloud loading system, in accordance with certain examples.

Turning now to FIG. 1, the figure is a block diagram of a system 100 that includes a distributed computing system 102 hosting a cloud loading system 104, according to certain examples. In the depicted embodiment, the cloud loading system 104 is communicatively coupled to a cloud-based system 106 that includes a cloud data store (e.g., data warehouse) 108. The cloud data store 108 includes relational databases, network databases, filesystem storage, and the like, which can be accessed via cloud-based facilities. The cloud loading system 104 is also communicatively coupled to a non-cloud based data store 114. The data store 114 can be a relational database, a network database, filesystem storage, and the like.

In the depicted example, various entities 110, 112, 116 are operatively coupled to the cloud-based system 106 and the cloud data store 108. The entity 110 is additionally operatively coupled to the data store 114. The entities 110, 112, 116 can include financial institutions such as banks, brokerages, insurance institutions, regulatory institutions such as the Federal Deposit Insurance Corporation (FDIC), the Securities and Exchange Commission (SEC), the Federal Reserve Bank (FRB), private entities, and so on. In some examples, a set of source data (e.g., from data stores and/or files) 118 includes information for upload into the data stores 108, 114, such as financial records, regulatory information, ledger information, and so on. The source data 118 may be in various different formats. Further, the data includes large number of records, such as 1,000,000 or more records. It is also to be noted that the source data 118 include data stored in databases, such as relational databases.

The cloud loading system 104 includes a schema creation system 122 that automatically creates a data schema 120 for a given source 118. In one example, the schema creation system 122 reads one or more records in the source (e.g., file) to identify the overall layout and data types of the input file. For example, the schema creation system 122 will read some records in the file to identify if the file is columnar versus row-based. When the data is columnar, the schema creation system 122 identifies each column data type (string, integer, etc.), length, position, and so on, and creates a schema (e.g., JSON-based schema) 120. Likewise, when the file is row-based, the schema creation system 122 identifies row cells, cell data type, length, position, and so on, and creates a corresponding schema 120. In some examples, the file includes a file header with metadata describing the file layout. For example, the metadata may identify column names, column data types, lengths, cell names, and more generally, describe how data in the file is laid out. The schema creation system 122 then reads the metadata in the file header and creates a corresponding schema 120. Accordingly, each of the files will be processed via the schema creation system 122 to derive an equivalent schema 120.

As mentioned earlier, the schemas 120 are JSON-based schemas. For example, the schemas 120 include Apache Avro™ schemas that describe file layout and record information for serialization. Serialization refers to converting data objects or structures (e.g., programmatic objects, classes, structures, and so on) into a format suitable for transmission over a network. More specifically, serialization converts a data object, which can include a combination of code and data represented within a region of data storage, into a series of bytes that saves the state of the object in an easily transmittable form. Accordingly, objects that are part of currently executing computer program are able to be stored via serialization. The schema includes certain data types, such as primitive data types (null, Boolean, int, long, float, double, bytes, and string) and complex data types (record, enum, array, map, union, and fixed). The "record" data type is a named type that has a set of named fields, each with its own type. Names are used to define named schema objects such as records, enums, and fixed types. Namespaces are similar to namespaces in programming languages and help avoid name conflicts. Enums define a type with a limited set of symbols. Arrays are used to hold items of the same type, while maps are used to manage variable fields with string keys and values of the defined type. Unions allow the use of multiple types, letting a field hold data of different types.

In certain examples, the partitioning system 124 partitions or otherwise divides larges files, such as files exceeding certain number of bytes, into various smaller files using a round robin distribution. The partitioning system 124 creates partitioned files 126 and corresponding control files 140. The control files 140 contains the record count for that partition and enable data verification checking that verifies that no data was lost or rejected during processing of that partition. An overall control file is also generated that contains the aggregated record counts and summaries across all partitioned files 126. The overall control file 140 serves as a single source of truth for the total record count and other metadata for the entire source 118. The control file 140 can also include or be linked to one or more schema files 120 that define how the data in each source 118 will be stored when loaded via the cloud loading system 104.

During loading operations, a file writing system 128 will then, for each of the source data 118, load an equivalent schema 120, connect with the data store 108 and/or 114, and transfer the data inside of the source 118. In one example, the schema 120 is used to create a corresponding one or more data structures in the data stores 108 and/or 114. If partition files 126 were created due to large sources 118, the file writing system 128 then serializes data in the partitioned files 126 into the data stores 108, 114, for example, in parallel. That, is multiple serialized data streams are opened by the file writing system 128 and used simultaneously to upload data, e.g., via serialization, from the partitioned files 126 into the data stores 108 and/or 114. Otherwise, the file writing system 128 serializes data in the source data 118. As mentioned earlier, serialization includes the process of converting a data object, which can include a combination of code and data represented within a region of data storage (e.g., in the source 118), into a series of bytes that saves the state of the object in an easily transmittable form. In this serialized form, the data can be delivered to the data stores 108 and/or 114.

As the data is being written into the data stores 108, 114, an I/O logging system writes one or more log files 132 detailing number of records written, locations written into (e.g., data stores 108, 114), any errors encountered, and the like. The log files 132 can then be compared, for example, against the control files 140, to determine if the number of data records written match the number of records found in the source data 118. More specifically, a reconciliation process occurs that compares the data records written into respective data stores 108 and/or 114 and records that were found in the source data 118. Records that were missed are then reuploaded. Further, the file writing system 128 automatically restarts record loading during certain event occurrences (e.g., communication interruptions). For example, if a communication link goes down to the data store 108, 114, the file writing system 128 will pause the data load, "ping" and re-establish communications, and then continue loading data that has not yet been loaded by comparing already loaded records in the I/O log file 132 with total records in the control file 140. In this manner, data in the data sources 118 is more reliably and more efficiently uploaded.

The distributed computing system 102 also includes a memory 134 and one or more processor 138 suitable for storing and executing the cloud loading system 104. The cloud loading system 104 is also shown as interfacing with a user 136 via a graphical user interface (GUI) 142 that includes certain user-customizable programmatic features, as further described below.

Figure 2:
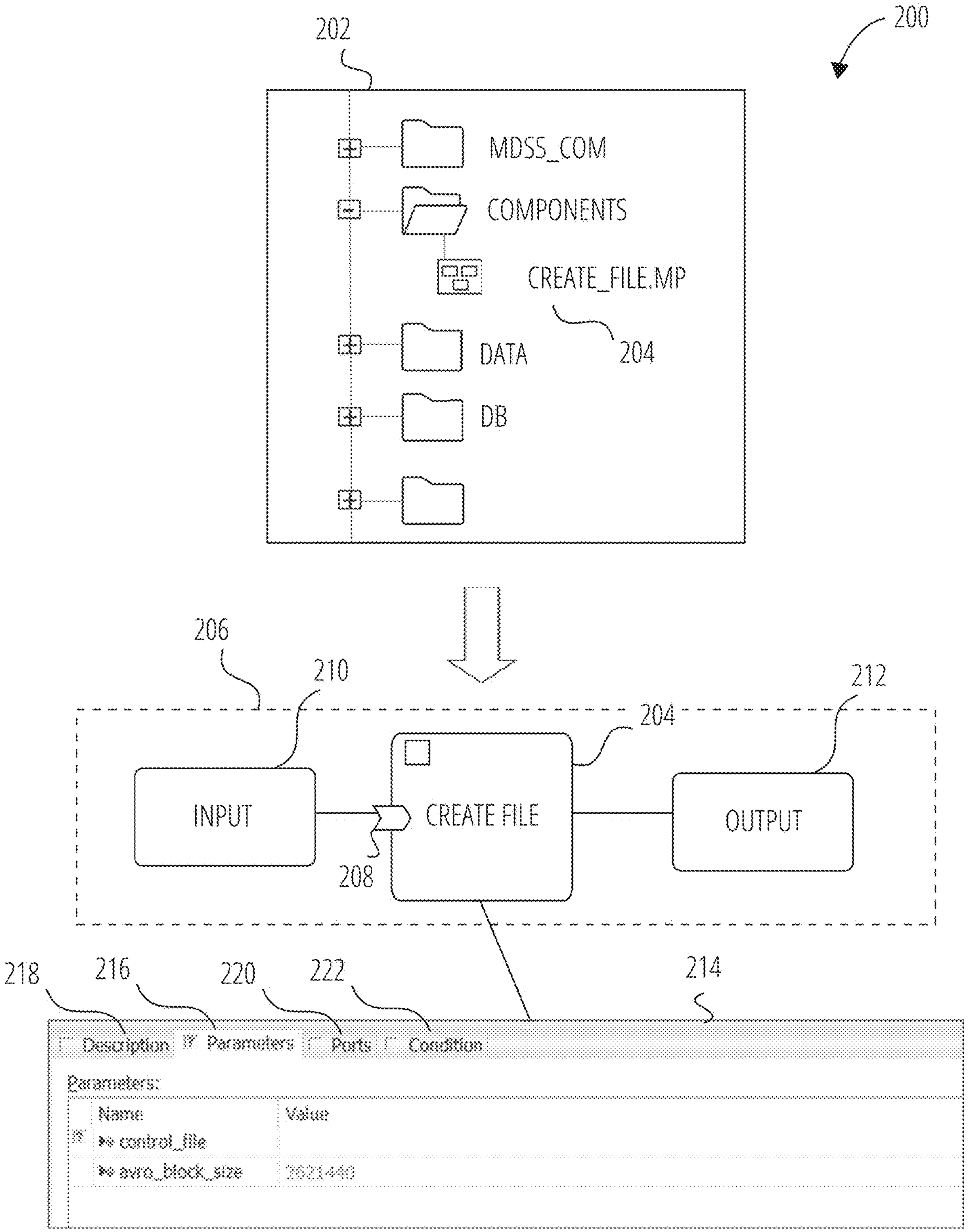
FIG. 2 is a block diagram illustrating an integrated development environment (IDE), in accordance with certain examples.

FIG. 2 is a block diagram of an integrated development environment (IDE) 200 suitable for developing computer code or programs with the cloud loading system 104, according to certain examples. In the depicted example, a treeview control 202 presented via a graphical user interface (GUI) of the IDE 200 lists one more "drag-and-drop" components that can be selected by a user (e.g., programmer) to create certain software. More specifically, the user can select a user-configurable cloud loading component 204 from the treeview control 202 and drop the user-configurable cloud loading component 204 into a computer program 206 for further development. The user-configurable cloud loading component 204 visually expands once dropped inside of the computer program 206 to show, for example, an input connector 208 suitable for receiving inputs (e.g., source data 118). In the depicted embodiment, an input module 210 has been attached to the input connector 208 to provide inputs to the user-configurable cloud loading component 204 for cloud data loading via serialization.

In some examples, the user-configurable cloud loading component 204 includes all of the functionality of the cloud loading system 104. That is, the user-configurable cloud component 204 provides for partitioning of data (e.g., via the partition system 124), creation of schemas (e.g., JSON-based schemas via the schema creation system 122), writing of partitioned data (e.g., via the file writing system 128), and logging of operations (e.g., via the I/O logging system 130).

In other examples, the treeview control 202 includes multiple components that provide for partitioning of data, creation of schemas, writing of partitioned data, and/or logging of operations that are then drag-and-dropped into the computer program 206. Certain outputs from the user-configurable cloud loading component 204 are provided to an output component 212. For example, logs, receipts verifying that certain data that has been uploaded, user names that uploaded certain data, dates of upload, times of upload, and so on, are then provided to the output component 212 for additional processing.

The user can enter user-configurable information for use by the user-configurable cloud loading component 204, for example, via a tabbed dialog box 214. For example, the user can right-click or otherwise activate the user-configurable cloud loading component 204 to show a pop-up menu that includes a selection to launch the dialog box 214. In some examples, the dialog box 214 includes various tabs, such as a parameters tab 216 enabling user-entered information. The parameters tab 216 is used to enter a block size for blocks in a serialized data stream or block size for a file to be uploaded, names and locations for control files 140, names and locations for I/O log files 132, secure credentials to use the data stores 108, 114, and so on.

A description tab 218 is provided, that includes a description of the user-configurable cloud loading component 204, including how to use the user-configurable cloud loading component 204 as part of a computer program, such as the computer program 206. A ports tab 220 is used to enter certain communication or data ports to use when reading and/or when writing data, and a condition tab 222 is used to enter certain conditions (e.g., logic and other variables) useful in developing with the user-configurable cloud loading component 204.

The user-configurable cloud loading component 204 is depicted as part of a visual computer program 206, such as a flowchart-based computer program that uses graphical icons and links to represent programming elements. By providing for a single drag-and-drop component 204 with schema-creation and serialization, the techniques described herein enable a more efficient software program development of data loading systems.

Figure 3:
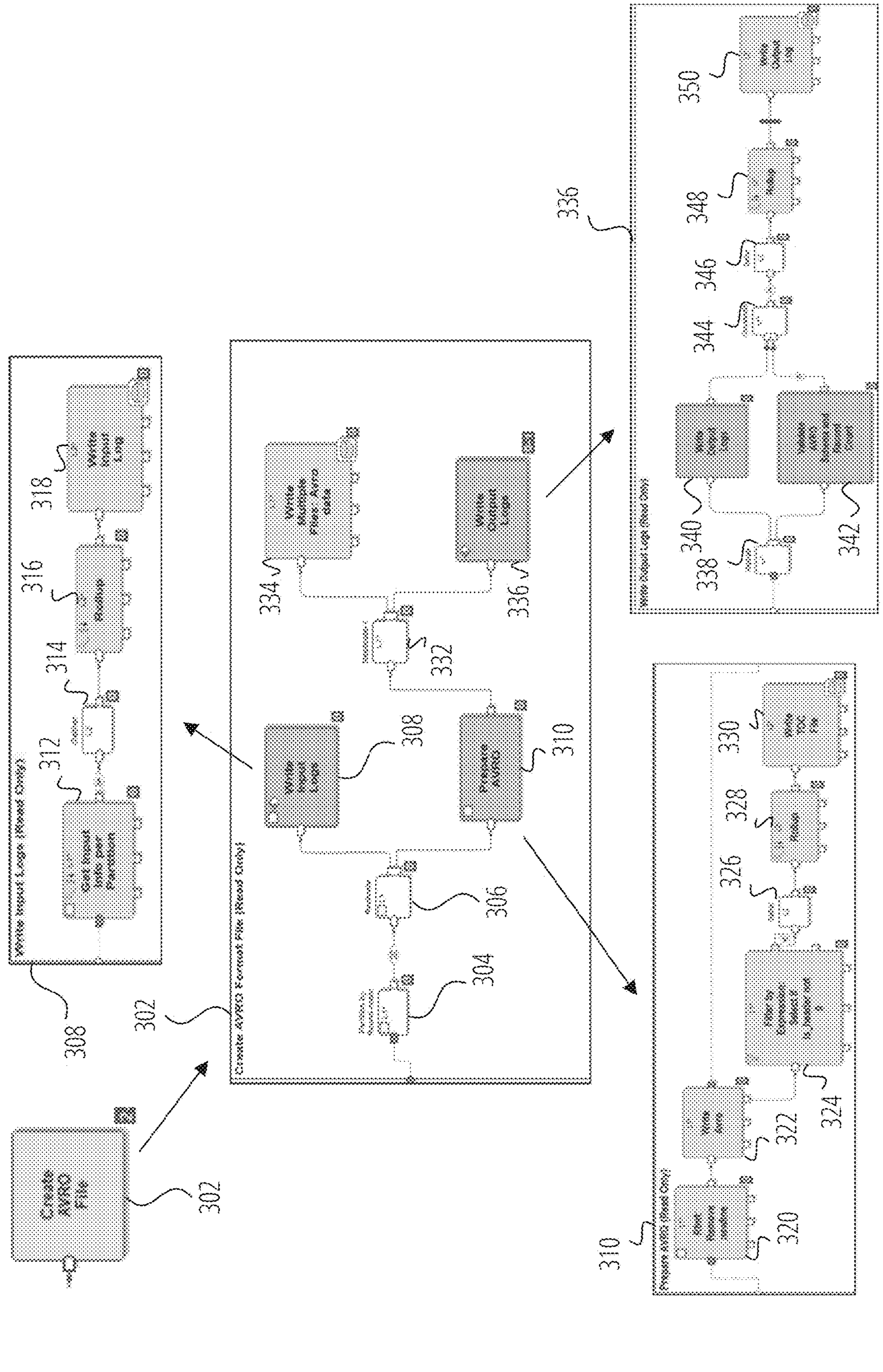
FIG. 3 illustrates a programming diagram with further implementation details of a user-configurable cloud loading component, according to certain examples.

FIG. 3 is a programming diagram with further implementation details of a user-configurable cloud loading component 302, according to certain examples. More specifically, FIG. 3 implements the user-configurable cloud loading component 302 using a graphical programming language, such as Ab Initio, having an Avro JSON-based schema. In the depicted example, the inputs into the user-configurable cloud loading component 302, such as the source data 118, are provided to a partition block 304. The partition block 304 will partition data via round robin distribution to arrive at partitioned files 126. The partitioned files 126 are provided to a replicate block 306. The replicate block 306 will then send the partitioned data both to a "write input logs" block 308 as well as to a "prepare Avro" block 310.

The "write input logs: block 308 will write to an input log of the I/O logs 132. More specifically, the "write input logs" block 308 will process each partitioned file via a "get input info per partition" block 312 to derive a record count, file size, retrieve any headers, and so on, for each partitioned file. A gather block 314 will then take in all of the information retrieved via the block 312 and provide the data to a rollup block 316. the rollup block 316 will group the information (e.g., grouped as a row of data) and then send the grouped information to a "write input log" block 318. The "write input log" block 318 will then write the partitioned file's information into the input log of the I/O logs 132.

The "prepare Avro" block 310 will prepare each partitioned file to include an Avro format. More specifically, a "reformat (rfmt) remove newline" block 320 reformats the partitioned file by removing newlines special characters and then passes the reformatted partitioned file to a "write Avro" block 322. The "write Avro" block 322 will then write the partitioned file as an Avro object container file. The Avro object container file will have a file header, followed by one or more file data blocks. The file header has four bytes, more specifically ASCII 'O', 'b', 'j', followed by the Avro version number which is 1 (0x01), e.g., binary values 0x4F 0x62 0x6A 0x01. The file header will also include file metadata, including the schema definition, e.g., JSON-based schema. The file header then includes a 16-byte, randomly generated sync marker for the file.

A "filter by expression" block 324 is used as the Avro object container file is being written. More specifically, the "filter by expression" block 324 filters out the header and then sends out to a gather block 326 to then provide certain data to a rollup block 328. The rollup block 328 will then group (e.g., into rows) values such as record counts, file size, and so on, of the Avro file being prepared. A "write TOC file" block 330 then writes, to a control file such as the control files 140, the data for validation at a later time. The control file includes a pset_name containing the name of pset or graph (e.g., computer code) to execute, a run condition whether to enable the component to generate Avro file while running in a sandbox mode or in an operational mode, an avro_file_path where Avro files are to be stored (Avro schema and target data manipulation languages (DMLs) will be placed at same location. The control file additionally includes a source. The source field can be used to place table name, Insert SQL file or Table DML of the target source. For example, "source": "$AI_SQL/load_wrk_acct_addr_info.sql", OR "source": "$MDSS_PUB_MDSS_BASE_DB/TAB_NAME", OR "source": "$AI_DML/load_wrk_acct_addr_info.dml." The control file also includes a dbc_file, so that in the case where source input value is a SQL file or a table, then dbc_file is mandatory to point to the database, and a logging field. The login field is used to capture input counts and validate output records and its count, input bytes read and capture filenames. Logging is then set to Boolean true to enable login, else to false. An example control file with values is as follows:

```
{
  "pset__name": "tld__load__utlty__wrk__acct__addr__info.pset",
  "run__condition": true,
  "avro__file__path": "$AI__SERIAL/wrk__acct__addr__info.avro",
  "avsc__generation": {
    "source": "$AI__SQL/load__wrk__acct__addr__info.sql",
    "dbc__file": "$MDSS__PUB__DB/mdss__teradata.dbc"
  },
  "logging": false
}
```

After preparing the Avro file via the "prepare Avro" block 310, the component 302 then uses a replicate block 332 to send the prepared Avro files to both a "write multiple files" block 334 and a "write output logs" block 336. The "write multiple files" block 334 will write, in parallel, the one or more Avro files prepared via the block 310 into a selected target repository, e.g., data sources 108, 114. The "write output logs" block 336 will then, via a replicate block 338, send the prepared Avro files to a second "write output logs" block 340 and to a "validate Avro schema and record count" block 342. The second "write output logs" block 340 will prepare data (e.g., record count data) for an output log of the I/O logs 132, while the "validate Avro schema and record count" block 342 will compare written records against a record count of an input Avro file to determine any discrepancies between written data and original data.

In the depicted example, a concatenate block 344 compares the original record count data with the written record count data and passes on a comparison to a gather block 346. The gather block 346 then passes on the comparison to a rollup block 348, which groups the data (e.g, in rows) for writing to the output log via a "write output log" block 350. In this manner, the component 302 provides for the creation and use of Avro files to load data.

Figure 4:
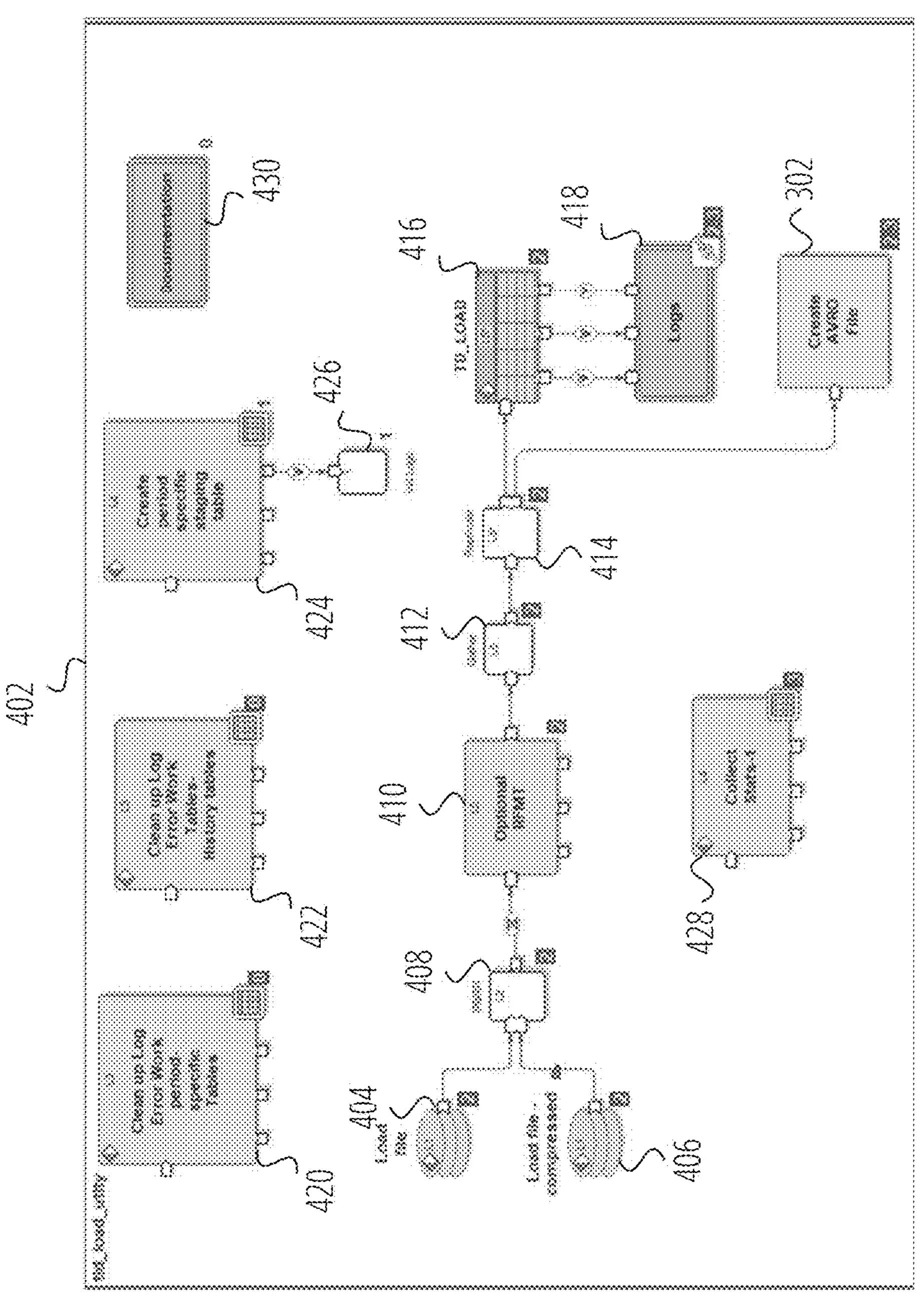
FIG. 4 illustrates a programming diagram illustrating the use of the user-configurable cloud loading component of FIG. 3 as part of a software program, according to certain examples.

FIG. 4 is a programming diagram illustrating the use of the user-configurable cloud loading component 302 in a software program 402, according to certain examples. More specifically, FIG. 4 executes the user-configurable cloud loading component 302 using a graphical programming language, such as Ab Initio, to load data. In the depicted example, a "load file" block 404 and a "load file compressed" block 406 provide source data 118 to be loaded into a target data store (e.g., data stores 108, 114). The blocks 404, 406, provide the source data 118 to a "partition by round robin (PBRR) block 408. The PBRR block 408 will then create various partitioned files via round robin distribution, such as partitioned files 126, and then provide the partitioned files to an "optional reformat (RFMT)" block 410.

The "optional RFMT" block 410 will then reformat the partitioned files, for example, by removing certain special characters, replacing certain characters with others, and so on, and pass the reformatted files to a gather block 412. The gather block 412 will then send the reformatted data to a replicate block 414, which will then send the reformatted data both to the user-configurable cloud loading component 302 as well as to a "TD_Load" block 416. The user-configurable cloud loading component 302 will create Avro files and use the Avro files to load data to the desired data source targets, e.g., data sources 108, 114. The "TD Load" block 416 will load the reformatted data in parallel to other desired table-based locations, for example, to keep a record of the reformatted data. The "TD Load" block 416 will additionally create logs 418 based on the reformatted data loaded.

The computer program 402 also shows certain cleanup operations being performed by certain blocks, such as blocks 420, 422. A "create period specific staging table" block 424 is also shown, that creates certain staging tables to be used, for example, as temporary data stores. A "init logs" block 426 performs certain log initiation operations, such as by setting flags and so on. Collecting database statistics provides the optimizer with the data demographics it needs to generate query plans. The more accurate and up to date the statistics, the better the optimizer can decide on plans and choose the fastest way to answer a query. A documentation block 430 is used to document the computer program 402 and the user-configurable cloud loading component 302. Accordingly, executing the computer program 402 will load certain source data, such as source data 118, into certain data sources, such as data sources 108, 114, via Avro files.

Figure 5:
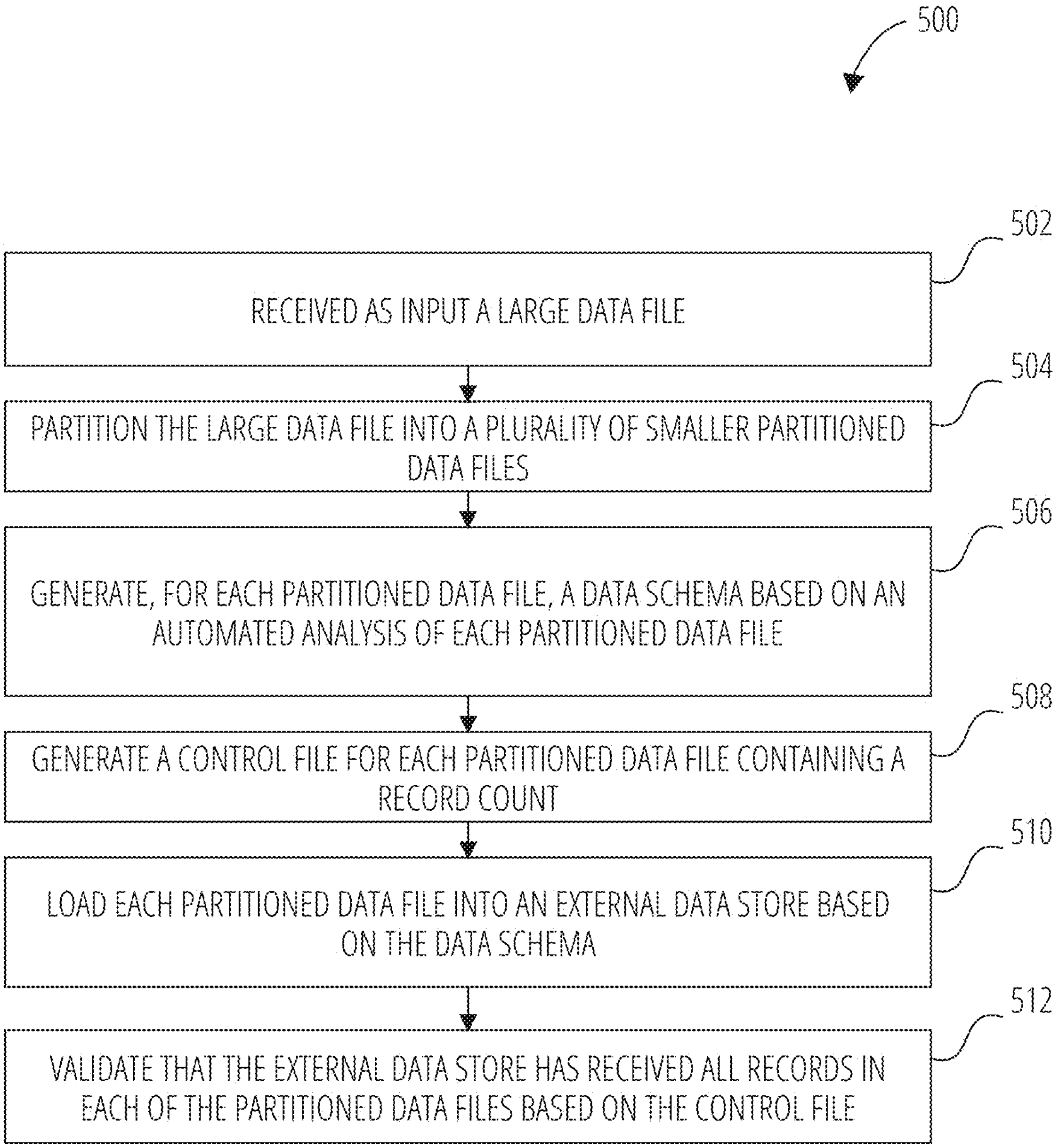
FIG. 5 illustrates a flowchart of a process suitable for loading various large files, in accordance to certain examples.

FIG. 5 is a flowchart of an example process 500 suitable for loading certain data into data stores, such as cloud-based data stores, according to certain examples. The process 500 is executable via the cloud loading system 104 and/or the cloud loading component The process 500, at block 502, receives as input a large file. As mentioned earlier, the set of source data (e.g., from data stores and/or files) 118 includes information for upload into the data stores 108, 114, such as financial records, regulatory information, ledger information, and so on. The source data 118 may be in various different formats. Further, the data includes large number of records, such as 1,000,000 or more records.

The process 500 at block 504, then partitions the large data file into a plurality of smaller partitioned data files, for example by using a round robin distribution to distribute the records via the partitioning system 124, resulting in the partitioned files 126. The process 500 then generates, for each partitioned data file, a data schema based on an automated analysis of each partitioned data file via the schema creation system 122. In some examples, the data schema is a JavaScript Object Notation (JSON)-based data schema. The data schema includes certain data types, such as primitive data types (null, Boolean, int, long, float, double, bytes, and string) and complex data types (record, enum, array, map, union, and fixed). The record data type is a named type that has a set of named fields, each with its own type. Names are used to define named schema objects such as records, enums, and fixed types. Namespaces are similar to namespaces in programming languages such as C# and help avoid name conflicts. Enums define a type with a limited set of symbols. Arrays are used to hold items of the same type, while maps are used to manage variable fields with string keys and values of the defined type. Unions allow the use of multiple types, letting a field hold data of different types.

The process 500 automatically generates, at block 506, the data schemas by reading one or more records in the data source (e.g., file) to identify the overall layout and data types of the input file. For example, the schema creation system 122 will read some records in the file to identify if the file is columnar versus row-based. When the data is columnar, the schema creation system 122 identifies each column data type (string, integer, etc.), length, position, and so on, and creates a schema (e.g., JSON-based schema) 120. Likewise, when the file is row-based, the schema creation system 122 identifies row cells, cell data type, length, position, and so on, and creates a corresponding schema 120. In some examples, the file includes a file header with metadata describing the file layout. For example, the metadata may identify column names, column data types, lengths, cell names, and more generally, describe how data in the file is laid out. The schema creation system 122 then reads the metadata in the file header and creates a corresponding schema 120.

The process 500 also generates, at block 508, a control file for each partitioned data file that contains a record count. That is, the control file stores a total number of records in each partitioned file to be used later for validation that the data uploaded includes all of the records in each partitioned data file. The process 500 then, at block 510, loads each partitioned data file into an external data store based on the data schema generated. For example, the file writing system 128 will load, for each of the source data 118, an equivalent schema 120, connect with the data store 108 and/or 114, and transfer the data inside of the source 118. In one example, the schema 120 is used to create a corresponding one or more data structures in the data stores 108 and/or 114. If partition files 126 were created due to large sources 118, the file writing system 128 then serializes data in the partitioned files 126 into the data stores 108, 114, for example, in parallel. That is, multiple data streams are opened by the file writing system 128 and used simultaneously to upload data, e.g., via serialization, from the partitioned files 126 into the data stores 108 and/or 114. Otherwise, the file writing system 128 serializes data in the source data 118. As mentioned earlier, serialization includes the process of converting a data object, which can include a combination of code and data represented within a region of data storage (e.g., in the source 118), into a series of bytes that saves the state of the object in an easily transmittable form. In this serialized form, the data can be delivered to the data stores 108 and/or 114.

During loading operations, certain conditions may occur that stop the loading, such as an interruption in communications to the data stores 108 and/or 114. The process 500 can automatically restart and reprocess any unloaded data. For example, the I/O log files 132 and the control files 140 can be used to determine the last record loaded, and thus the next record(s) to continue loading after a restart. The process 500 then validates, at block 512, that the external data store (e.g., data stores 108, 114) has received all records in each of the partitioned data files based on the control file.

Figure 6:
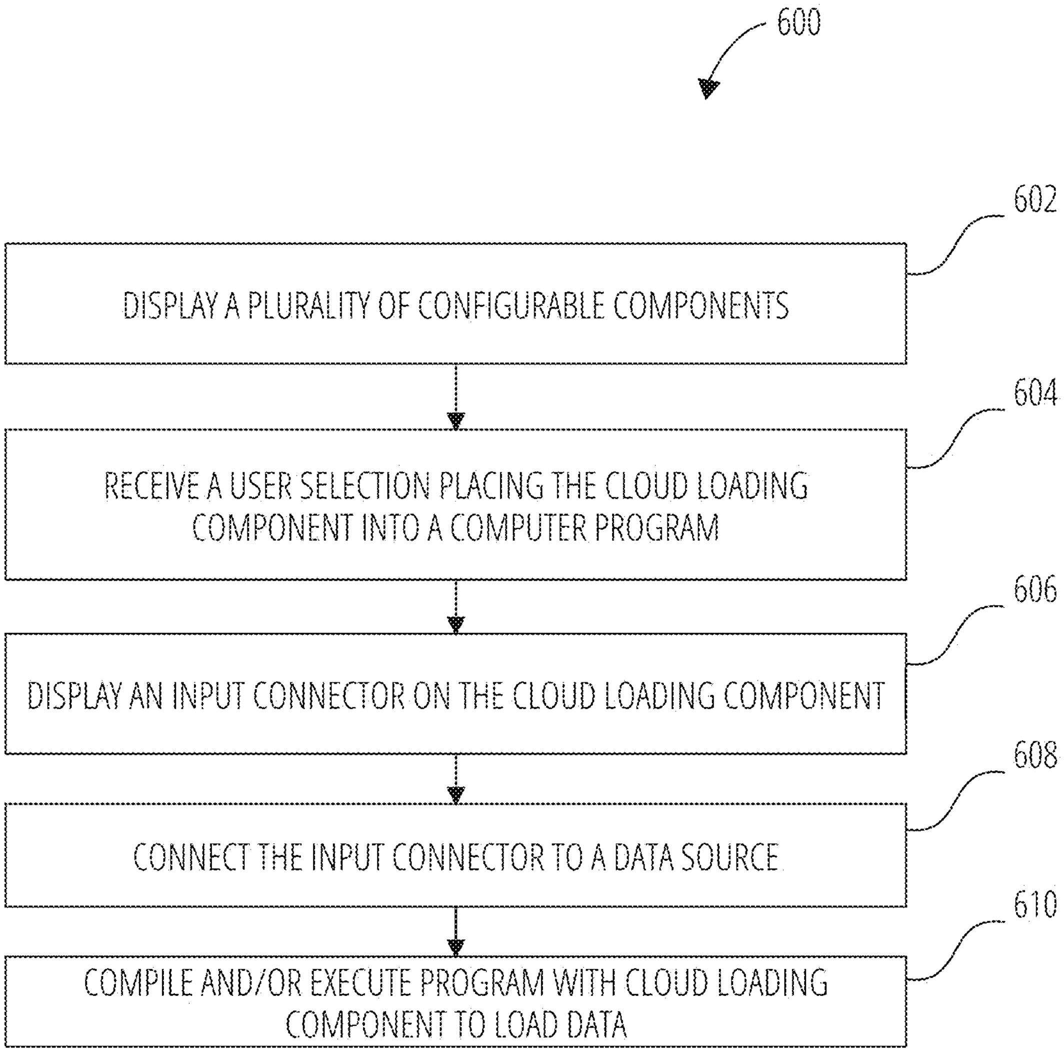
FIG. 6 illustrates a flowchart of a process suitable for using a user-configurable cloud loading component as part of a computer program, in accordance to certain examples.

FIG. 6 is a flowchart of an example process 600 suitable for using a data loading component such as the user-configurable cloud loading component 204, 302 as part of a computer program, according to certain examples. In the depicted example, the process 600 displays, at block 602, a plurality of configurable components, including the user-configurable cloud loading component 204. For example, the treeview control 202 is used to display the configurable components. The process 600, at block 604, then receives a user selection placing the cloud loading component 204 (or 302) into a computer program. For example, the user can drag-and-drop the user-configurable cloud loading component 204 into the computer program 206 via the integrated development environment (IDE) 200.

The process 600, at block 606, displays an input connector on the cloud loading component. The input connector, such as connector 208, will be used to provide input data from various sources, including other components provided via the IDE 200. The process 600 will then, at block 608, connect the input connector to a data source. The data source can include data stores, such as the data stores 108, 114. The data source can also include other components (e.g., modules, classes, objects, and the like) that extract, transform, and/or load data via the input connector.

The process 600 then, at block 610, will compile or otherwise execute the computer program having the user-configurable cloud loading component to load the data. As mentioned earlier, the loading uses serialization to converts a data object, which can include a combination of code and data represented within a region of data storage, into a series of bytes that saves the state of the object in an easily transmittable form into the desired data store.

Figure 7:
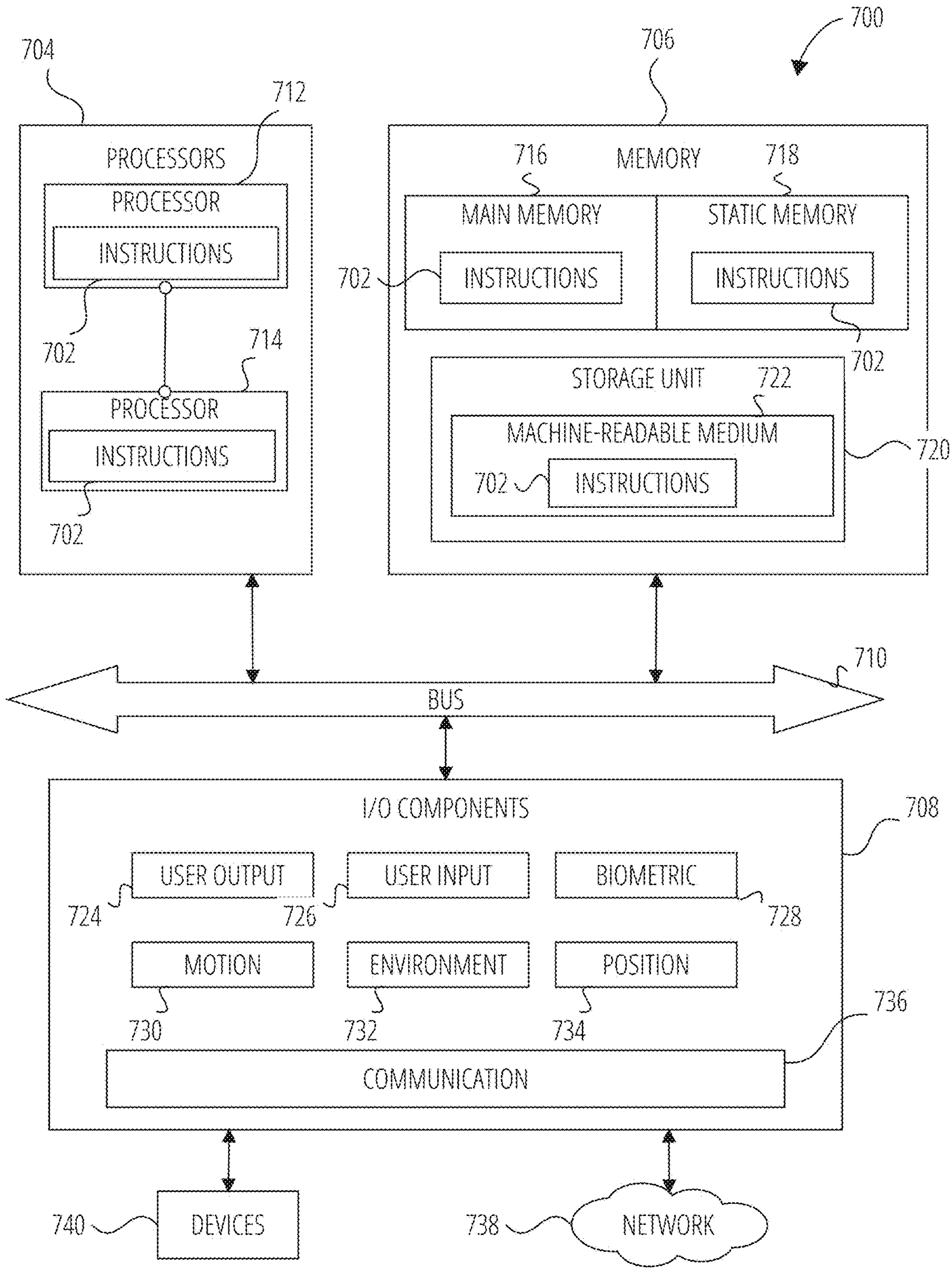
FIG. 7 is a block diagram depicting a machine suitable for executing instructions via one or more processors, in accordance with certain examples.

FIG. 7 is a diagrammatic representation of a machine 700 within which instructions 702 (e.g., software, a program, an application, an applet, an app, or other executable code) for causing the machine 700 to perform any one or more of the methodologies discussed herein may be executed. For example, the instructions 702 may cause the machine 700 to execute any one or more of the processes or methods described herein, such as the process 500. The instructions 702 transform the general, non-programmed machine 700 into a particular machine 700, e.g., the cloud loading system 104 and the user-configurable cloud loading component 204, programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while a single machine 700 is illustrated, the term "machine" shall also be taken to include a collection of machines that individually or jointly execute the instructions 702 to perform any one or more of the methodologies discussed herein. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 708, which may be configured to communicate with each other via a bus 710. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 712 and a processor 714 that execute the instructions 702. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 716, a static memory 718, and a storage unit 720, both accessible to the processors 704 via the bus 710. The main memory 716, the static memory 718, and storage unit 720 store the instructions 702 embodying any one or more of the methodologies or functions described herein. The instructions 702 may also reside, completely or partially, within the main memory 716, within the static memory 718, within machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific I/O components 708 that are included in a particular machine will depend on the type of machine. For example, portable machines such as mobile phones may include a touch input device or other such input mechanisms, while a headless server machine will likely not include such a touch input device. It will be appreciated that the I/O components 708 may include many other components that are not shown in FIG. 7. In various examples, the I/O components 708 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 708 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 734 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 further include communication components 736 operable to couple the machine 700 to a network 738 or devices 740 via respective coupling or connections. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a universal serial bus (USB) port), internet-of-things (IoT) devices, and the like.

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 716, static memory 718, and memory of the processors 704) and storage unit 720 may store one or more sets of instructions and data structures (e.g., software) embodying or used by any one or more of the methodologies or functions described herein. These instructions (e.g., the instructions 702), when executed by processors 704, cause various operations to implement the disclosed examples.

The instructions 702 may be transmitted or received over the network 738, using a transmission medium, via a network interface device (e.g., a network interface component included in the communication components 736) and using any one of several well-known transfer protocols (e.g., hypertext transfer protocol (HTTP)). Similarly, the instructions 702 may be transmitted or received using a transmission medium via a coupling (e.g., a peer-to-peer coupling) to the devices 740.

The techniques described herein provide for analyzing large amounts of financial data to automatically provide for focused financial health advising. Financial health templates are created based on the financial data analysis, that include financial plans for reaching desired goals related to improving a consumer's spending habits, increasing credit scores, achieving savings goals, paying off one or more loans, and the like. In certain examples, the techniques described herein analyze financial data from consumer peers that have achieved similar improvements in financial health, thus improving the chances that a user can reach a desired financial goal.

What is claimed is:

1. A system, comprising:

one or more processors; and a cloud loading system executable on the one or more processors and configured to:

receive as input a large data file;

partition the large data file into a plurality of smaller partitioned data files;

generate, for each partitioned data file, a data schema based on an automated analysis of each partitioned data file;

generate a control file for each partitioned data file containing a record count, wherein the control file is generated automatically during generation of each of the partitioned data files and is unique to the respective partitioned data file, and wherein the control file further comprises a schema-linked metadata for validation of serialized data blocks used by the cloud loading system to load and validate the serialized data blocks;

load each partitioned data file into a data store external to the cloud loading system based on the data schema; and validate that the external data store has received all records in each of the partitioned data files based on the schema-linked metadata, wherein the cloud loading system is provided as a user-configurable cloud loading component used for developing a computer program, wherein the user-configurable cloud loading component comprises a graphical user interface (GUI) block configured to provide one or more subcomponents that programmatically define writing in parallel, of the partitioned data files into the data store, and wherein the GUI block is configured to be placed by a user into a programmatic graphical flow that results in the computer program.

2. The system of claim 1, comprising an integrated development environment (IDE) including the GUI configured to:

display a plurality of user-configurable components including the user-configurable cloud loading component; and receive a user selection placing the user-configurable cloud loading component into the computer program, wherein the computer program is developed using the IDE.

3. The system of claim 2, wherein the IDE is further configured to:

display an input connector on the user-configurable cloud loading component for connecting to one or more of the plurality of the user-configurable components to receive the large data file; and display a dialog box for the cloud loading component to receive user-entered parameters including block size, control file locations, log file locations, credentials for accessing the external data store, or a combination thereof.

4. The system of claim 3, wherein the IDE is further configured to compile the computer program into an executable program that is executable on the one or more processors.

5. The system of claim 2, wherein the GUI is configured to display the plurality of configurable components including the configurable cloud loading component in a treeview control.

6. The system of claim 1, wherein the data schema is a JavaScript Object Notation (JSON)-based data schema.

7. The system of claim 6, wherein the JSON-based data schema includes data types comprising null, Boolean, int, long, float, double, bytes, string, record, enum, array, map, union, fixed, Names, Namespaces, or a combination thereof.

8. The system of claim 1, wherein generating, for each partitioned data file, the data schema based on an automated analysis of each partitioned data file comprises reading one or more records in each partitioned data file to identify an overall file layout and data types of the records and creating the data schema based on the overall file layout and data types.

9. The system of claim 8, wherein reading one or more records comprises reading a file header for each partitioned data file, the file header comprising a metadata describing a layout for each partitioned data file.

10. The system of claim 8, comprising a serialization of the serialized data blocks by converting a data object into a series of bytes that saves a state of the data object into at least one of the serialized data blocks.

11. The system of claim 1, wherein the cloud loading system is configured to load each partitioned data file into the data store via serialization.

12. The system of claim 1, wherein the cloud loading system is configured to automatically restart the load of each partitioned data file into the data store if communications are interrupted with the data store.

13. The system of claim 12, wherein the cloud loading system is configured to read a log file of loading operations and the control file to determine records in each partitioned data file that have not yet been loaded.

14. The system of claim 13, wherein the cloud loading system is configured to continue loading the records in each partitioned data file that have not yet been loaded.

15. The system of claim 1, wherein the data store comprises a cloud-based data store storing data accessible by a plurality of entities.

16. The system of claim 15, wherein the plurality of entities comprise financial entities, regulatory entities, private entities, or a combination thereof.

17. A non-transitory machine-readable medium storing instructions that, when executed by a computer system, cause the computer system to perform operations comprising:

receiving as input a large data file;

partitioning the large data file into a plurality of smaller partitioned data files;

generating, for each partitioned data file, a data schema based on an automated analysis of each partitioned data file;

generating a control file for each partitioned data file containing a record count, wherein the control file is generated automatically during generation of each of the partitioned data files and is unique to the respective partitioned data file, and wherein the control file further comprises a schema-linked metadata for validation of serialized data blocks used by a cloud loading system to load and validate the serialized data blocks;

loading, via the cloud loading system, each partitioned data file into a data store external to the cloud loading system based on the data schema; and validating that the data store has received all records in each of the partitioned data files based on the schema-linked metadata, wherein the cloud loading system is provided as a user-configurable cloud loading component used for developing a computer program, wherein the user-configurable cloud loading component comprises a graphical user interface (GUI) block configured to provide one or more subcomponents that programmatically define writing, in parallel, of the partitioned data files into the data store, and wherein the GUI block is configured to be placed by a user into a programmatic graphical flow that results in the computer program.

18. The non-transitory machine-readable medium storing instructions of claim 17, comprising further operations to:

displaying, via the GUI included in an integrated development environment (IDE), a plurality of user-configurable components including the user-configurable cloud loading component; and receiving, via the GUI, a user selection placing the user-configurable cloud loading component into the computer program, wherein the computer program is developed using the IDE.

19. A method, comprising:

receiving as input a large data file;

partitioning the large data file into a plurality of smaller partitioned data files;

generating, for each partitioned data file, a data schema based on an automated analysis of each partitioned data file;

generating a control file for each partitioned data file containing a record count, wherein the control file is generated automatically during generation of each of the partitioned data files and is unique to the respective partitioned data file, and wherein the control file further comprises a schema-linked metadata for validation of serialized data blocks used by a cloud loading system to load and validate the serialized data blocks;

loading, via the cloud loading system, each partitioned data file into a data store external to the cloud loading system based on the data schema; and validating that the data store has received all records in each of the partitioned data files based on the schema-linked metadata, wherein the cloud loading system is provided as a user-configurable cloud loading component used for developing a computer program, wherein the user-configurable cloud loading component comprises a graphical user interface (GUI) block configured to provide one or more subcomponents that programmatically define writing, in parallel, of the partitioned data files into the data store, and wherein the GUI block is configured to be placed by a user into a programmatic graphical flow that results in the computer program.

20. The method of claim 19, further comprising:

displaying, via the GUI included in an integrated development environment (IDE), a plurality of user-configurable components including the user-configurable cloud loading component; and receiving, via the GUI, a user selection placing the user-configurable cloud loading component into the computer program, wherein the computer program is developed using the IDE.

* * * * *